(12) United States Patent
Alkas et al.

(10) Patent No.: US 8,434,963 B2
(45) Date of Patent: May 7, 2013

(54) DISPLAY SUPPORT STRUCTURE AND METHOD

(75) Inventors: Dean Alkas, Oak Forest, IL (US); Michael Carrow, Chicago, IL (US)

(73) Assignee: Orbus/P3, Bolingbrook, IL (US)

( * ) Notice: Subject to any disclaimer, the term of this patent is extended or adjusted under 35 U.S.C. 154(b) by 334 days.

(21) Appl. No.: 12/795,518

(22) Filed: Jun. 7, 2010

(65) Prior Publication Data

US 2011/0296660 A1 Dec. 8, 2011

(51) Int. Cl.
*F16B 21/00* (2006.01)
*F16B 21/02* (2006.01)

(52) U.S. Cl.
USPC ............ 403/306; 411/555; 24/663; 248/250; 248/469; 248/694; 403/248; 403/255; 403/292; 403/314; 403/402; 403/DIG. 12; 40/606; 40/610; 52/582.2; 52/766; 52/767; 52/768; 52/769; 52/770; 52/771; 52/772; 52/773; 29/525.01

(58) Field of Classification Search ............... 29/525.01; 24/663; 248/250, 469, 694; 403/248, 255, 403/292, 294, 300, 306, 314, 350–352, 373–374.3, 403/401, 402, 409.1, DIG. 8, DIG. 12; 40/606, 40/610; 52/582.2, 766, 767, 768, 769, 770, 52/771, 772, 773
See application file for complete search history.

(56) References Cited

U.S. PATENT DOCUMENTS

| | | | | |
|---|---|---|---|---|
| 4,207,655 A * | 6/1980 | MacMaster | ................... | 411/350 |
| 4,378,615 A * | 4/1983 | Gunther | ...................... | 411/555 |
| 4,625,477 A * | 12/1986 | Johnstonbaugh | ............ | 52/127.9 |
| 4,653,970 A * | 3/1987 | Ballantyne | .................... | 411/555 |
| 4,657,462 A * | 4/1987 | Hoen | ............................ | 411/552 |
| 5,461,808 A * | 10/1995 | Fritts | ................................ | 40/571 |
| 5,687,859 A * | 11/1997 | Miller | ........................... | 211/189 |
| 6,047,509 A * | 4/2000 | Savoie | ............................. | 52/281 |
| 6,267,543 B1* | 7/2001 | David et al. | ................... | 411/552 |
| 2007/0196196 A1* | 8/2007 | Schorling et al. | ............ | 411/555 |

\* cited by examiner

*Primary Examiner* — A. Dexter Tugbang
*Assistant Examiner* — Anthony Green
(74) *Attorney, Agent, or Firm* — Leydig, Voit & Mayer, Ltd.

(57) ABSTRACT

A connector for rigidly engaging elongate structural members in a display structure includes a beam connection portion defined on a body and having a cavity. A semi-cylindrical guide surface of the cavity is adjacent to an opening. The opening has an elliptical shape in which the difference between a major and a minor axis is an offset distance. An eccentric fastener is rotatably disposed in the cavity and includes a head portion that protrudes from the opening and engages a hole of the elongate structural member, and a cam portion that is eccentrically disposed relative to the head portion and configured to engage the semi-cylindrical surface when the eccentric fastener is rotated relative to the connector.

14 Claims, 5 Drawing Sheets

DISPLAY SUPPORT STRUCTURE AND METHOD

BACKGROUND OF THE INVENTION

The present invention relates to support structures for portable or permanent displays and the like, such as those used in trade shows. More particularly, the disclosure relates to an apparatus and method used to connect adjacent structural members of a display in a longitudinal direction.

A typical display structural member is often in the form of a pulltruded aluminum beam having a generally rectangular cross section. The beam internally forms a generally rectangular hollow channel that is surrounded on two opposite sides by open channels. The open channels may extend along the entire length of the structural member and serve as anchoring features for adjustably connectable clamps and other locking devices, such as those used to mount display panels, shelves, lighting, tables, and other exhibit booth elements to the support structure.

In the past, structural members for displays were connectable lengthwise to one another by use of removable clamps engaged within the internal hollow channel of the support members. A clamp would be sized to fit within the hollow channel of the structural member such that one end of the clamp is disposed inside the member and arranged to engage the walls of the channel, while the other side of the clamp extends beyond the end of the member such that an adjacent member can be disposed thereon. To clamp the member, the clamp includes two hinged jaws on either end that can be pushed apart by a threaded fastener disposed therebetween. The fastener may be threaded into one of the jaws and operate to push the second jaw away from the first jaw, thus clamping the beam.

In known arrangements, the jaws of such clamps are inserted into opposed structural members during connection of the members to each other. The screws on either end may be tightened via corresponding holes formed in the support members to provide access to the fasteners. As the fasteners are tightened, the jaws on either side of the clamp are forced apart and against the walls of the internal channel of the two structural members such that the two members are engaged to the clamp.

Although such known clamps are effective in joining structural members lengthwise, the clamps can easily become worn. They also cannot provide a solid engagement between the structural members. Such known clamps are also not well suited for providing proper axial or planar alignment between adjacent structural members. Finally, they tend to be somewhat difficult to assembly and disassemble.

BRIEF SUMMARY

The present disclosure provides a connector for structural members or beams of a display, such as portable or permanent displays used in trade shows and the like, that is simple, easy to use, and provides improved retention and less wear over previously known designs. The effectiveness and ease of use of the disclosed connectors involves engagement of rotationally eccentric features. In a preferred embodiment, a user may simply depress the head of the fastener, which protrudes from the connector, slip the end of the structural member over the connector, and release the head of the fastener. The head of the fastener is configured to snap in place within a preformed hole located adjacent an end of the beam. An audible "click" informs the user of appropriate positioning, and even in the unlocked state, the fastener is able to retain the end of the beam in engagement with the connector. To lock the connector, a user may simply turn the fastener to engage the cam feature and rigidly constrain the end of the beam onto the connector.

More specifically, the present disclosure provides, in one aspect, a connector or a display structure that includes a connector for rigidly engaging elongate structural members. The connector includes a beam connection portion defined on a body and having a cavity. A semi-cylindrical guide surface of the cavity is adjacent to an opening. The opening has an elliptical shape in which the major and minor diameters differ by an offset distance. An eccentric fastener is rotatably disposed in the cavity and includes a head portion that protrudes from the opening and engages a hole of the elongate structural member, and a cam portion that is eccentrically disposed relative to the head portion. The cam is configured to engage the semi-cylindrical surface when the eccentric fastener is rotated relative to the connector.

In another aspect, the disclosure provides a method for connecting elongate structural members or beams end to end in a portable or permanent display structure. The method includes providing a pocket and a hole at the end of each beam, and inserting a connector between beams by depressing a head of a fastener disposed on either of at least two ends of the connector such that the end of the beam passes over the head portion while the fastener is in an unlocked position. The head portions of the fasteners are extended through the hole in each respective end of the beams to initially secure the beams on the connector. The fasteners are then rotated to a respective locked position to engage the beams onto the connector. Engagement between the connector and the beams occurs by an eccentric rotation of the respective heads of the fasteners that occurs during rotation of the fasteners to their respective locked positions. In this way, the eccentric rotation of the head portions creates an engagement with the respective holes of the beams that operates to pull the beams deeper over the connector and in abutting contact with one another.

DETAILED DESCRIPTION OF THE INVENTION

Figure 1:
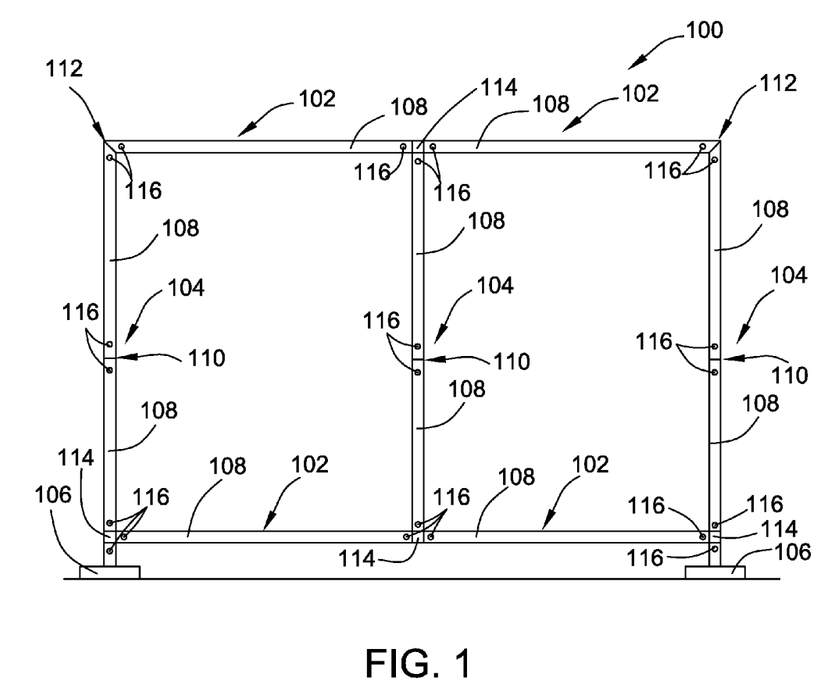
FIG. 1 is a side view of an exemplary arrangement of structural members arranged into a display structure in accordance with the invention.

An exemplary arrangement of a display structure 100 is shown in FIG. 1. The display structure 100 is shown having a rectangular shape with horizontal members 102 and vertical members 104 that are interconnected to one another. The entire structure is held upright by two bases 106, and is configured to support display panels, shelves, video screens, lighting fixtures, and the like as is known. Although the display structure 100 is shown having a generally planar shape made up of linear structural members 102 and 104, any other shape can be provided in the known fashion for such displays.

In the illustrated embodiment, the display structure 100 is made up of linear beams 108 having a rectangular cross section and channels (not shown) running along the entire length of each beam 108. The beams 108 are connected at their respective ends to provide rigid structural joints that form the structure of the display 100. A few examples of joint types are shown in FIG. 1, but it should be appreciated that joints in accordance with the embodiments of the present invention may be configured to permit joining of any number of beams 108 and/or other structural features at any angle.

More specifically, the display 100 includes three types of joints, each of which includes a connector for joining adjacent beams 108. Thus, inline joints 110 are used to join axially abutting ends of beams 108 such as those used along the vertical members 104. Angled joints 112 are used to join mitered ends of beams 108 that abut one another at each of the two top corners of the display 100. T-type joints 114 are used to join abutting ends of three beams 108 as shown, for example, at the two bottom corners and at either end of the middle of three vertical members 104 of the display 100. Each end of each beam 108 that engages a connector (shown in subsequent figures) at a joint 110, 112, and 114, includes an eccentric fastener 116. Each eccentric fastener 116 is advantageously configured to engage and rigidly retain the structural connection between joined ends of beams 108, as is described in more detail in the disclosure and drawings that follow.

Figure 2:
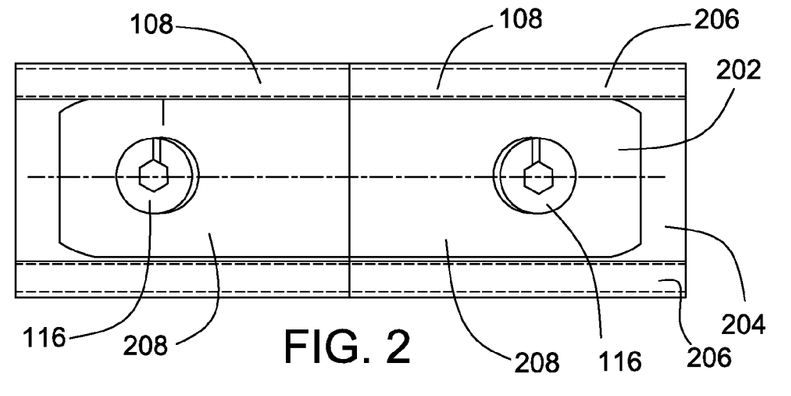
FIGS. 2, 3, and 4 are views of connectors for structural members in accordance with a first embodiment of the invention.
Figure 3:
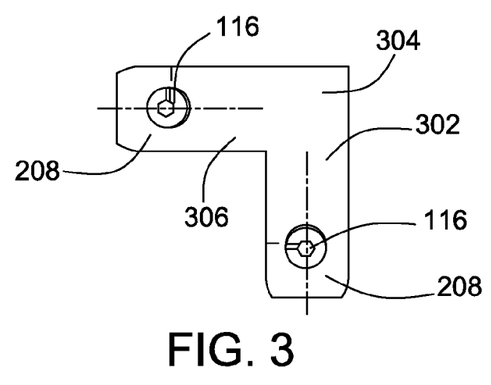
Figure 4:
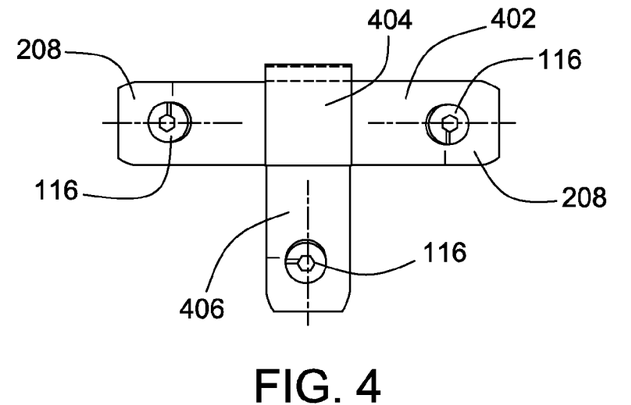

A first embodiment of the fastener 116 is shown installed in different exemplary connectors in FIGS. 2-4. In these figures, an inline connector 202 is shown in FIG. 2, an angled connector 302 is shown in FIG. 3, and a T-type connector 402 is shown in FIG. 4. As is shown more particularly in FIG. 2, the beams 108, which may be made of extruded or pulltruded aluminum, plastic, glass fiber composite, or any other suitable material, define a pocket, which in the illustrated embodiment is a central rectangular channel 204. The beam 108 further includes side channels 205 extending along two of its outer faces. The inline connector 202 includes a body 206 that has a generally rectangular cross section. The body 206 is arranged to have a clearance fit when disposed within the central channel 204. The body 206 further includes cavities, which are described in further detail hereinafter, each of which accommodates a fastener 116. Although a rectangular channel or pocket is shown in the illustrated embodiments, other cross sectional shapes may be used. For example, the beams 108 may have a circular, semi-circular, polygonal, or any other shape. Further, although a pulltruded beam is shown, other methods for forming the beams may be used, such as solid members having pockets formed at their ends rather than channels extending through the entire beam. Even further, it should be appreciated that the connector body may be configured to mate with the shape of the channel or pocket formed in the beam. For instance, a tubular beam having a channel extending therethrough may be configured to be engaged by a connector having a generally cylindrical shape.

In the illustrated embodiment, each connector 202, 302, and 402 includes a beam connection portion 208, which includes the fastener 116. In the embodiment of the inline connector 202, two beam connection portions 208 are disposed end to end adjacent one another such that two beams 108 are connected linearly. In the case of the angled connector 302, two beam connection portions 208 are disposed at ninety degrees apart, and are connected by a mid-portion 304 of the body 306. In the case of the T-type connector 402, three beam connection portions 208 are connected at right angles around a mid-portion 404 of the body 406.

Each beam connection portion 208 is arranged to be disposed within and engage an end of a beam 108, as shown in FIG. 2. In this way, any number of beam connection portions 208 can be arranged around a body portion, for example, up to six for any generally rectangular-shaped body portion, depending on the shape and configuration of the finished display. Moreover, it should be further appreciated that a single beam connection portion 208 may be formed on the end of a display component, such as a light fixture, support base, shelf bracket, and so forth, for enabling the connection of any component desired onto the end of a beam.

Figure 5:
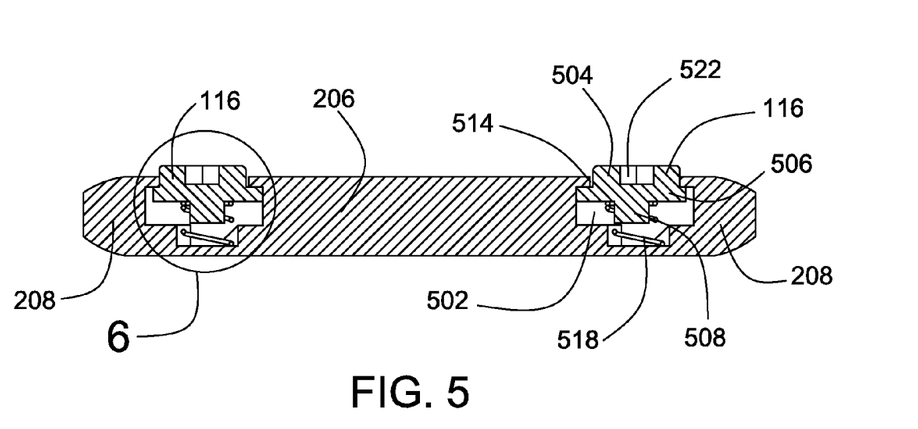
FIGS. 5 and 6 are detail views in cross section of a connector in accordance with the invention.
Figure 6:
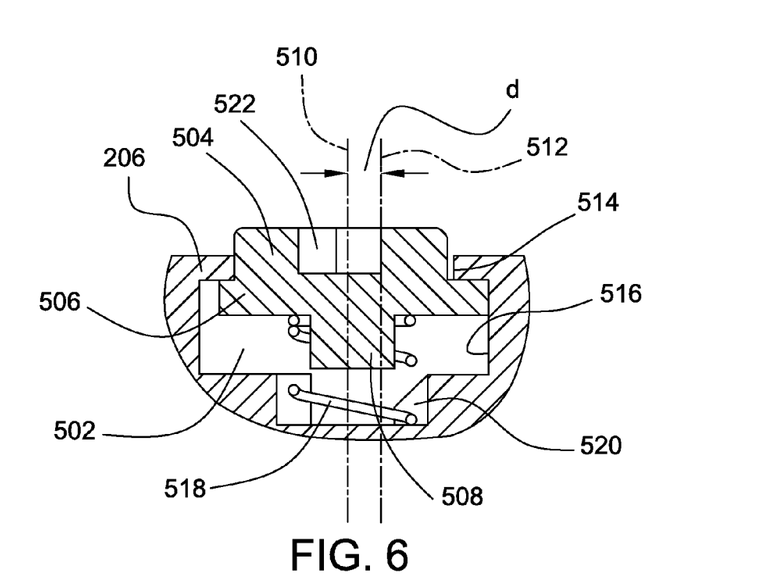

A cross section of the inline connector 202 is shown in FIG. 5 as an example for discussion, with a detail view thereof in the area surrounding one of the fasteners 116 shown in FIG. 6. In the description that follows, features and elements that are the same or similar to corresponding features and elements already described are denoted by the same reference numerals as previously used for simplicity. Accordingly, the body 206 forms two cavities 502, each of which accommodates one of the fasteners 116.

Figure 7:
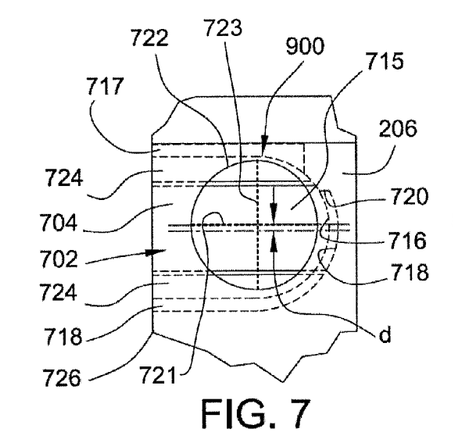
FIG. 7 is a detail view of an alternate embodiment of a connector cavity in accordance with the invention.
Figure 8:
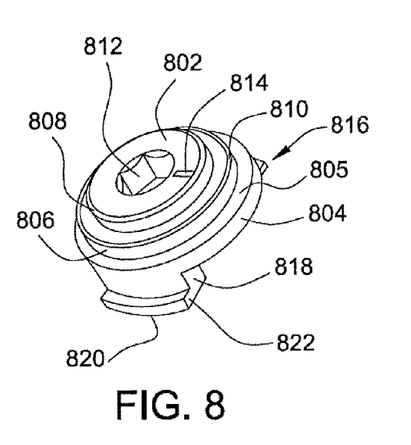
FIGS. 8-11 are outline views from different perspectives of an eccentric fastener for a connector having a cavity as shown in FIG. 7, in accordance with a second embodiment of the invention.

Each fastener 116 includes a head portion 504, a cam portion 506 and, in the illustrated embodiment, an optional spring guide 508. Each of the head and cam portions 504 and 506 has a generally cylindrical cross section, and the two portions 504 and 506 are eccentric relative to one another. Specifically, a centerline 510 of the head portion 504 is offset by a distance, d, relative to a centerline 512 of the cam portion 506. As is best shown in FIG. 6, an outer diameter of the head portion 504 has a clearance fit within the inner portion of an opening 514 defined in the body 206. The opening 514 is open to the cavity 502 such that the head portion 504 of the fastener 116 protrudes through the opening 514 when the fastener 116 is disposed in the cavity 502. The opening 514, as shown in FIGS. 1-4, has an elliptical shape that includes an ellipse having a major diameter 723 and a minor diameter 721, as shown in FIG. 7. The lengths of the major and minor diameters 723 and 721 of the ellipse are different by a distance, d.

The cam portion 506 is rotatably disposed within a semi-cylindrical guide surface 516, which is eccentrically disposed relative to the centerline 512 of the cam portion 506 such that one side of the cam portion 506 abuts the semi-cylindrical guide surface 516. The semi-cylindrical guide surface 516 is disposed at the end of a channel (shown and described below relative to FIG. 7) that is formed transversely in the body 206 and has a generally rectangular cross section. Although alternative arrangements may be used, the transverse channel provides a passageway through the body for installation and removal of the fastener 116 into the connector 202.

In the illustrated embodiment, the connector 202 includes an optional spring 518 associated with each fastener 116. As shown, the spring 518 is a compression spring that is disposed, in a partially compressed state, between the guide 508 of the fastener 116 and a recess 520 defined in the cavity 502. The spring 518 imparts a force tending to maintain the fastener 116 in abutting relationship with the top of the cavity 502, in the orientation shown in the drawings. Rotation of the fastener 116 within the body 206 may be accomplished by any appropriate means, such as a wrench (not shown) inserted into a drive 522 formed in the head portion 504.

A partial top view of an alternate embodiment for the cavity 502 defined in the body 206 is shown in FIG. 7 and denoted by reference numeral 702 for clarity. The cavity 702 is configured to cooperate with an alternate embodiment for the fastener 116, which is denoted as fastener 816 and shown from various perspective views in FIGS. 8-11. As shown in FIG. 7, the cavity 702 includes a channel portion 704 and a generally semi-cylindrical portion 715 that includes a semi-cylindrical guide surface 716. As is best shown in the cross sections of FIGS. 12 and 13, the cavity 702 is flanked by shallow raceways 717 and 718. As can be seen from the top view of FIG. 7, one of the raceways 718 extends peripherally around the semi-cylindrical guide surface 716 up to a stop 720. The stop 720 is optional and may include a radially extending surface as shown.

An opening 722 is defined in the body 206 and is open to the cavity 702. The opening 722 has a substantially elliptical shape in which the major diameter is larger than the minor diameter by a distance, d, as denoted in FIG. 7. The semi-cylindrical guide surface 716 is disposed eccentrically relative to the opening 722 and is aligned with a channel 724 that extends through one side 726 of the body 206. In this way, the fastener 816 may be inserted into the body 206 from the side.

Turning now to the alternate embodiment for the fastener 816 shown in FIGS. 8-11, the fastener 816 includes a head portion 802, a cam portion 804, and a lead portion 806. A bearing surface 805 extends radially between the cam and lead portions 804 and 806. Each of the head, cam and lead portions 802, 804 and 806 has a generally cylindrical shape with a circular cross section having a different diameter from the others. The head and lead portions 802 and 806 are concentric relative to one another, while the cam portion 804 is eccentrically disposed relative to the head and lead portions 802 and 806 by an offset distance, D.

The fastener 816 further includes optional features, which facilitate its engagement function as will be described in the paragraphs that follow. One optional feature are chamfers 808 and 810 that are formed, respectively, along the outer edges of the head and lead portions 802 and 806. An internal hexagonal drive 812 and an orientation mark 814 are also formed on the flat outer surface of the head portion 802. Moreover, a spring guide 817 is formed on the inner portion of the cam portion 804, and two legs 818 extend perpendicularly away from the inner surface of the cam portion 804 and are disposed at diametrically opposite locations relative thereto.

Figures 9, 10:
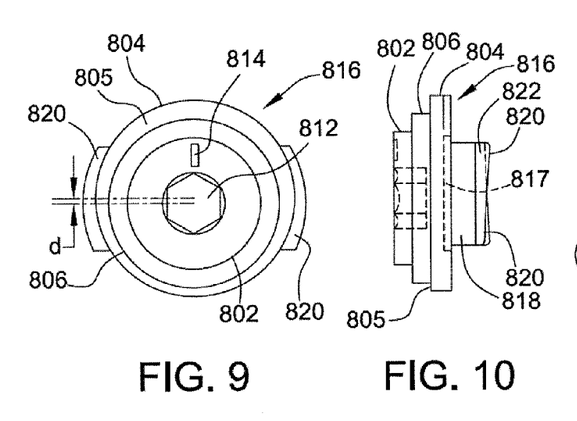
Figure 11:
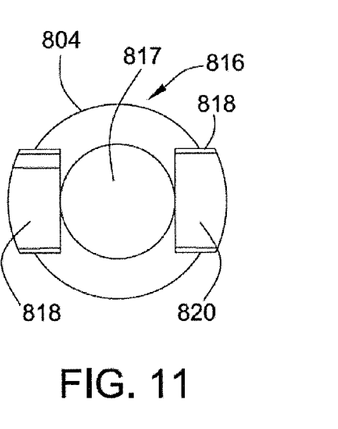

Each leg 818, both of which are shown to have the same width but each of which may alternatively have a different width, includes an axially inclined surface 820 that is formed along one or both faces of a ledge 822. Each ledge extends away from its respective leg 818 in a radial direction, and both ledges 822 are disposed to extend away from one another radially. In the illustrated embodiment, the inclined surfaces 820 are formed on the side of the respective ledge facing away from the head portion 802. As best shown in FIG. 10, the inclined surfaces 820 are configured in a fashion similar to a left-handed thread pattern so as to extend away from the head portion 802 when the fastener 816 is rotated in a clockwise direction.

Figure 12:
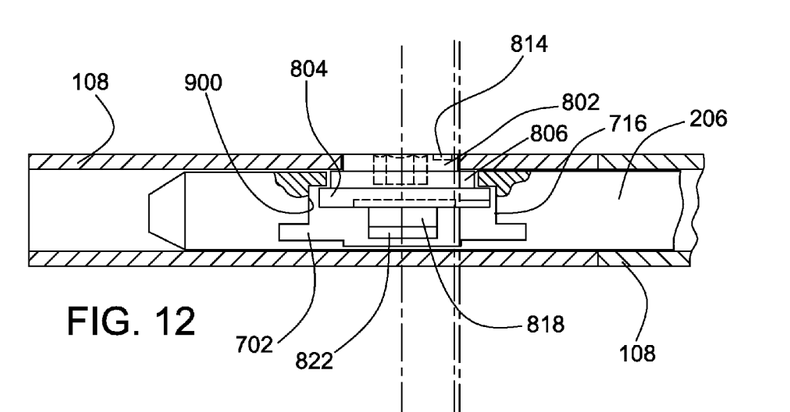
FIGS. 12 and 13 are cross section views of a connector in two operating positions in accordance with the invention.
Figure 13:
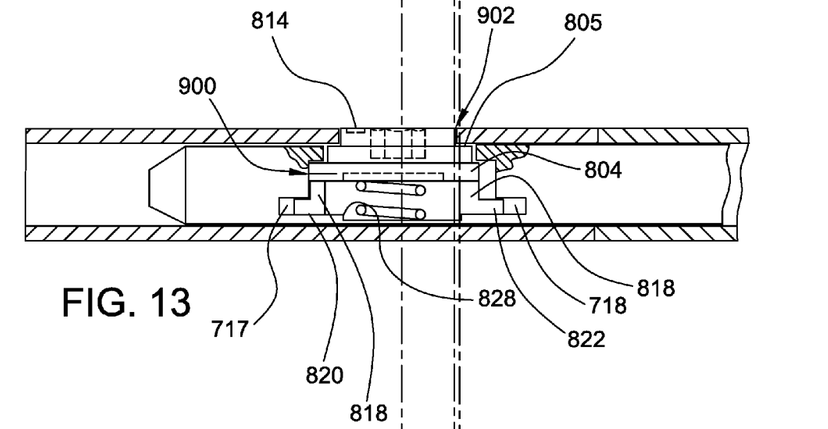

Two cross sections illustrating the fastener 816 in two operating positions are shown in FIGS. 12 and 13. FIG. 12 is an illustration of a portion of the body 206 having been inserted into an end of the beam 108 as previously described with the fastener 816 being rotated into an unlocked position. Similarly, FIG. 13 shows the same components in a locked position. Locking of the beam 108 onto the beam connection portion 208 as used herein means that a rigid and/or aligned engagement is accomplished between the two components. When an additional beam 108 (shown in FIG. 12) is locked onto a corresponding connection portion 208 of the same connector, the two beams 108 are rigidly engaged with one another in an aligned fashion.

As shown, the end of the beam 108 includes a hole 824. The hole 824 is appropriately sized to provide a clearance fit with the outer diameter of the head portion 802 of the fastener 816. When the end of the beam 108 is inserted over the beam connection portion 208, the fastener 816 is depressed into the cavity 702 to permit passage of the upper (in the orientation shown) wall of the beam 108 over the head portion 802 of the fastener 816. The beam 108 is considered to be sufficiently inserted over the beam connection portion 208 when the hole 824 is disposed over the opening 722. In this position, the head portion 804 of the fastener 816 is disposable in the opening 722. Thereafter, the fastener is urged upwardly, for example, by use of a spring 826, such that the head portion 802 enters the hole 824 and the lead portion 806 is once again disposed within the opening 722. This condition is shown FIG. 12.

After the beam 108 has been inserted over the beam connection portion 208, locking of the beam 108 is accomplished by rotation of the fastener 816 within the body 206. More specifically, when the fastener 816 is in an unlocked position, as shown in FIG. 12, the cam portion 804 is disposed such that it either does not touch the semi-cylindrical guide surface 716 or, alternatively, any contact between the two occurs somewhere other than an outer longitudinal location 900 thereof, as denoted in FIG. 7 (also shown in FIGS. 12 and 13). The outer longitudinal location 900 is a portion of the semi-cylindrical guide surface 716 that is disposed closest to a leading end of the beam connection portion 208.

When locking the beam 108, the fastener 816 is rotated, for example, in a clockwise direction by use of a tool inserted into the drive 812. During rotation, the lead portion 806 of the fastener 816 freely rotates within the opening 722 while a radially outermost segment of the offset cam portion 804 approaches and eventually contacts the outer longitudinal location 900 of the semi-cylindrical guide surface 716. Contact between the cam portion 804 and the semi-cylindrical guide surface 716 is a sliding contact type of motion that occurs over a peripheral length of the semi-cylindrical guide surface 716 of about 10 to 15 degrees relative to the rotating motion of the fastener 816.

When the cam portion 804 is engaged with the semi-cylindrical guide surface 716 at the outer longitudinal location 900, the eccentric offset distance, D, between the cam portion 804 and the head and guide portions 802 and 806 pushes the fastener 816 in an inward direction or away from the leading end of the beam connection portion 208. As the fastener 816 is urged axially away from the leading end of the beam connection portion 208, the lead portion 806 moves within the opening 722 such that the head portion 802 engages an inner side 902 of the hole 824 and thus urges the beam 108 deeper over the beam connection portion 208. For example, in the case of an inline connector 202, an opposing beam 108 is disposed over an opposite end of the connector 202. In this condition, the location and dimensional features of the connector 202 are arranged to urge the two opposing beams 108 in abutting relationship with one another such that when the fasteners 816 on either side of the connector 202 are placed in their respective locked positions, the ends of the two beams 108 are pushed together by the relative motion of the head portions 802 of the two fasteners 816 towards one another. This compressive force provided to the interface between the two ends of the opposing beams 108 provides a rigid connection therebetween.

In the illustrated embodiment, the fastener 816 includes additional clamping characteristics, which although are optional, may provide an improved clamping configuration between the beam connection portion 208 and the beam 108. Accordingly, the raceways 717 and 718 provide engagement surfaces for the axially inclined surfaces 820. When the fastener 816 is in an unlocked position, the legs 818 are disposed within the main cavity 702 to enable the depression of the fastener 816 within the cavity 702 during insertion of the beam 108 as previously described.

When moving to the locked position, rotation of the fastener 816 causes the ledges 822 to swing into the raceways 717 and 718. Continued rotation of the fastener 816 will thus cause contact between a bottom surface 828 of the raceways 717 and 718 with the two axially inclined surfaces 820. The incline of the surfaces 820 coupled with the location of the bottom surfaces 828 operates to push the fastener 816 in an upward direction such that the bearing surface 805 begins to protrude from the opening 722. The protrusion of the bearing surface 805 provides contact between the bearing surface 805 and an inner wall of the beam 108, which creates a compressive force therebetween acting to provide additional engagement and rigidity in the connection between the beam 108 and the beam connection portion 208 when the fastener is in the locked position. Optionally, a leading edge of the ledge 822 disposed within the raceway 718 may contact the stop 720 to positively limit the rotation of the fastener 816 when in the unlocked position.

As can be appreciated, the embodiments disclosed herein are advantageously arranged to provide rigid yet easily insertable and removable connectors for beams. Given the application of such connectors to display structures, an additional advantage may be realized in the aesthetic concealment of the connectors within channels formed in the beams. Moreover, the low profile of the fasteners used in the connectors, which generally remain within the profile of the beams, is advantageous both from an aesthetic standpoint as well as from a functional standpoint insofar as they head portions of the fasteners do not interfere with the mounting of display panels onto the display structure.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A connector for rigidly engaging elongate structural members in a display structure, the connector configured to interconnect at least two elongate structural members end to end, each structural member having a pocket and a hole defined at one end thereof, the connector comprising:

a body;

a beam connection portion defined at a free end of the body;

a cavity formed in the beam connection portion of the body, the cavity including a semi-cylindrical guide surface having a generally semi-circular cross sectional shape around a centerpoint;

an opening defined in the body and being open to the cavity adjacent the semi-cylindrical guide surface, wherein the opening has an elliptical shape in which the difference between a major and a minor diameter thereof is an offset distance;

an eccentric fastener rotatably disposed in the cavity, the eccentric fastener comprising:

a head portion having a generally cylindrical shape, the head portion protruding from the opening and adapted to be disposed in the hole of the elongate structural member when the pocket is disposed over the beam connection portion of the body and the hole is disposed over the opening;

a cam portion having a generally cylindrical shape that is eccentrically disposed relative to the head portion, the cam portion configured to engage at least a portion of the semi-cylindrical surface when the eccentric fastener is rotated relative to the connector, wherein at least one raceway is defined peripherally around at least a portion of the semi-cylindrical surface, and wherein the eccentric fastener further includes a leg having a ledge, the leg extending away from the fastener within the cavity, the ledge extending radially away from the leg and forming an inclined surface such that when the eccentric fastener is rotated, the inclined surface of the ledge engages a surface of the raceway and provides a biasing force tending to push the eccentric fastener towards the opening.

2. The connector of claim 1, wherein the cavity further comprises a channel portion that is open to a semi-cylindrical portion that is at least partially defined by the semi-cylindrical guide surface, the channel portion being open from a side surface of the body such that the eccentric fastener is insertable into the cavity.

3. The connector of claim 1, further comprising a resilient element disposed between the body and the eccentric fastener, wherein the resilient element provides a force urging the eccentric fastener against the opening.

4. The connector of claim 1, further comprising an additional beam connection portion formed on the body, the beam connection portion and the additional beam connection portion being disposed at an angle relative to one another.

5. The connector of claim 1, wherein the angle is selected from the group comprising 0 degrees, 90 degrees, 180 degrees, and 270 degrees, and wherein the angle is measured relative to one of three orthogonal axes.

6. The connector of claim 1, wherein the eccentric fastener further comprises a lead portion having a generally cylindrical shape and disposed between the head and cam portions,
wherein the lead portion is concentrically disposed in the opening relative to the head portion, and wherein a radially extending bearing surface is defined between the head and lead portions that is adapted to push against an inner surface of the pocket surrounding the hole of the elongate structural member when the eccentric fastener is in a locked position.

7. The connector of claim 1, wherein the cam portion is configured to abut an outer longitudinal location of the semi-cylindrical surface such that the head portion is pushed against an inner longitudinal location of the hole when the elongate structural member is disposed on the connector and when the eccentric fastener is in a locked position.

8. A display structure, comprising:
at least two elongate structural members, each structural member having a pocket and a hole defined at one end thereof;
a connector disposed to rigidly connect the two elongate structural members at their respective ends, the connector comprising:
a body;
a beam connection portion defined at a free end of the body;
a cavity formed in the beam connection portion of the body, the cavity including a semi-cylindrical guide surface having a generally semi-circular cross sectional shape around a centerpoint;
an opening defined in the body and being open to the cavity adjacent the semi-cylindrical guide surface, wherein the opening has an elliptical shape in which the difference between a major and a minor diameter thereof is an offset distance;
an eccentric fastener rotatably disposed in the cavity, the eccentric fastener comprising:
a head portion having a generally cylindrical shape, the head portion protruding from the opening and disposed in the hole;
a cam portion having a generally cylindrical shape that is eccentrically disposed relative to the head portion, the cam portion configured to engage at least a portion of the semi-cylindrical surface when the eccentric fastener is rotated relative to the connector;
wherein at least one raceway is defined peripherally around at least a portion of the semi-cylindrical surface, and wherein the eccentric fastener further includes a leg having a ledge, the leg extending away from the fastener within the cavity, the ledge extending radially away from the leg and forming an inclined surface such that when the eccentric fastener is rotated, the inclined surface of the ledge engages a surface of the raceway and provides a biasing force tending to push the eccentric fastener towards the opening.

9. The display structure of claim 8, wherein the cavity further comprises a channel portion that is open to a semi-cylindrical portion that is at least partially defined by the semi-cylindrical guide surface, the channel portion being open from a side surface of the body such that the eccentric fastener is insertable into the cavity.

10. The display structure of claim 8, further comprising a resilient element disposed between the body and the eccentric fastener, wherein the resilient element provides a force urging the eccentric fastener against the opening.

11. The display structure of claim 8, further comprising an additional beam connection portion formed on the body, the beam connection portion and the additional beam connection portion being disposed at an angle relative to one another.

12. The display structure of claim 8, wherein the angle is selected from the group comprising 0 degrees, 90 degrees, 180 degrees, and 270 degrees, and wherein the angle is measured relative to one of three orthogonal axes.

13. The display structure of claim 8, wherein the eccentric fastener further comprises a lead portion having a generally cylindrical shape and disposed between the head and cam portions, wherein the lead portion is concentrically disposed in the opening relative to the head portion, and wherein a radially extending bearing surface is defined between the head and lead portions that is adapted to push against an inner surface of the pocket surrounding the hole of the elongate structural member when the eccentric fastener is in a locked position.

14. The display structure of claim 8, wherein the cam portion is configured to abut an outer longitudinal location of the semi-cylindrical surface such that the head portion is pushed against an inner longitudinal location of the hole when the elongate structural member is disposed on the connector and when the eccentric fastener is in a locked position.

* * * * *